United States Patent [19]
Whiteley

[11] 4,008,410
[45] Feb. 15, 1977

[54] COMMUTATOR FOR DISCOIDAL ARMATURE

[75] Inventor: Eric Whiteley, Peterborough, Canada

[73] Assignee: Canadian General Electric Company Limited, Toronto, Canada

[22] Filed: Mar. 6, 1975

[21] Appl. No.: 556,117

[30] Foreign Application Priority Data
Mar. 13, 1974 Canada .............................. 194870

[52] U.S. Cl. .............................. 310/237; 310/235; 310/268
[51] Int. Cl.$^2$ ........................................ H02K 13/04
[58] Field of Search .......... 310/237, 198, 268, 200, 310/43, 236, 266, 233, 208, 234; 29/597, 598, 605; 178/52, 53

[56] References Cited
UNITED STATES PATENTS

| | | | |
|---|---|---|---|
| 3,193,715 | 7/1965 | Moressee | 310/237 |
| 3,524,251 | 8/1970 | Burr | 310/268 |
| 3,525,008 | 8/1970 | Burr | 310/237 |
| 3,599,325 | 8/1971 | Burr | 29/597 |
| 3,619,899 | 11/1971 | Takeda | 310/268 |
| 3,648,360 | 3/1972 | Tucker | 310/268 |
| 3,790,835 | 2/1974 | Takeda | 310/237 |
| 3,845,339 | 10/1974 | Merkle | 310/268 |
| 3,863,336 | 2/1975 | Noto | 310/268 |
| 3,869,788 | 3/1975 | Lazaroiu | 310/237 |

FOREIGN PATENTS OR APPLICATIONS
771,292  11/1967  Canada .............................. 310/268

Primary Examiner—R. Skudy
Attorney, Agent, or Firm—R. A. Eckersley

[57] ABSTRACT

A discoidal armature for dynamoelectric machines has its winding conductors bonded together in a rigid structure by means of a resinous material, and its commutator bonded to the structure. The structure has a disc portion containing the coil sides and outer and inner ring portions containing the coil end-heads and other end connections. The coils have their sides and end-heads of shapes which permit them to nest closely together in an annular array of overlapping coils. They are stranded and have the strands in their side arranged to provide a tapered disc portion which is thicker at the inner ring portion than it is at the outer ring portion. The commutator consists of an annular array of segments bonded to the disc portion adjacent the outer ring portion and presents a working face on the side of the disc portion. A similar array of segments can be bonded to the other side of the disc portion to obtain a duplex commutator.

6 Claims, 6 Drawing Figures

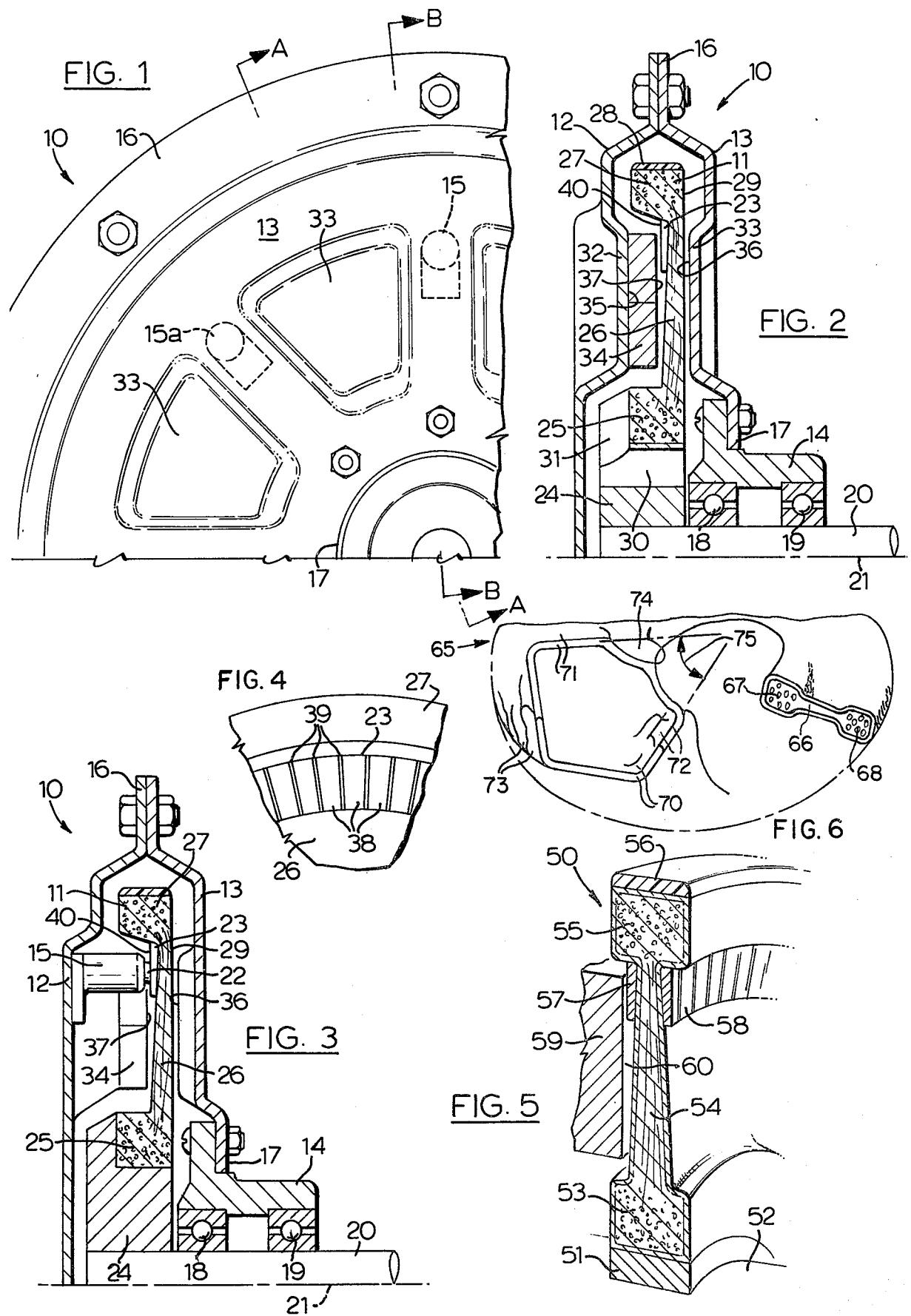

COMMUTATOR FOR DISCOIDAL ARMATURE

This invention relates to discoidal armatures, and in particular to commutators for these armatures.

Copending U.S. application, Ser. No. 534,009 filed Dec. 24, 1974, Eric Whiteley illustrates and describes a discoidal armature in which a stranded winding is laid in a flat, circular pattern and bonded together by means of a resinous material into a unitary, rigid structure in the configuration of an annular disc portion located between inner and outer ring portions. The disc is a relatively thin member which contains the sides of the coils and decreases gradually in thickness from the inner to the outer ring portion; the ring portions are somewhat thicker because they contain the coil end-heads.

The object of this invention is to provide commutating means suitable for use on the aforementioned discoidal winding structure.

A discoidal armature for an axial gap dynamoelectric machine consists essentially of a rigid winding structure provided with at least one commutator. The winding structure has a thin annular disc portion containing the coil sides and enlarged ring portions on the inner and outer edges of the disc containing the coil end conductors, all of which portions constitute a unitary structure of winding conductors bonded together with a strong, adherent, non-conductive bonding medium, e.g., a resinous material. The annular disc portion has flat outer surfaces that converge from the inner ring portion to the outer ring portion. The winding itself consists of a plurality of coils laid in a flat circular pattern overlapping in the lay, each coil having one or more strands and/or turns. Each coil has its sides disposed radially at approximately one pole pitch, and has sides in which the strands diverge in the winding disc portion along the flat surfaces thereon as the radially disposed sides converge from the inner ring portion to the outer ring portion. Hence, along the surfaces of the winding disc portion the sides of a coil are wider at the outer end-head than they are at the inner end-head, and transverse to these surfaces the sides are wider at the inner end-head than they are at the outer end-head. This produces the aforementioned tapered disc portion. The commutator consists of an annular array of segments bonded to the disc portion adjacent the outer ring portion and presents a working face at the outer surface of the disc portion. A similar array of segments can be bonded to the other surface of the disc portion to obtain a duplex commutator.

A better understanding of the invention may be had from the following description taken with the accompanying drawings, in which FIG. 1 is a half-view of a disc machine looking at its shaft;

FIG. 2 is a half-section taken on A-A of FIG. 1;

FIG. 3 is a half-section taken on B-B of FIG. 1;

FIG. 4 is a plan view of a portion of the commutator Shown in FIGS. 2 and 3;

FIG. 5 is a sector in perspective of an armature having two commutators; and

FIG. 6 is a perspective view of an armature having a portion broken away to show the coils and the lie thereof.

The machine 10 illustrated in FIGS. 1 to 3 is a disc-type, permanent magnet, DC machine suitable for use either as a motor or as a generator. However, for purposes of the description to follow, it will be referred to hereinafter as a motor. These Figures (i.e. FIGS. 2 and 3) show one half of the machine only; the other half is the same. Machine 10 consists essentially of an armature 11 supported for rotation in a stator having housing members 12 and 13, an armature supporting structure 14, and brush assemblies 15.

Housing members 12 and 13 are dish-shaped members made of a magnetic material such as mild steel and serve as the yoke of the magnetic field circuit and provide a substantial portion of the enclosure of the machine. They have their outer edges 16 formed with means for maintaining them in alignment, and are secured together at these edges. Member 13 has an open center defined by the inner edge portion 17, and has the bearing retaining member 14 secured to this inner edge portion. The armature supporting structure 14 includes a bearing housing and the ball bearings 18 and 19 retained inside the housing and supporting the shaft 20 of armature 11 for rotation on its axis 21. Each one of the brush assemblies 15 consists of an insulating brush holder supported by housing member 12 and carrying a conductive brush 22 that bears against a working face of a commutator 23 on armature 11.

Armature 11 resembles a disc wheel. It consists of the following annular portions disposed concentrically about axis 21, shaft 20; a hub 24 secured to the shaft; an inner ring portion 25 secured to the hub; a disc portion 26 integral with the inner ring portion; an outer ring portion 27 integral with the disc portion; a prestressed band of insulation 28 on the periphery of the outer ring portion; a single commutator 23 on the disc portion adjacent the outer ring portion. More will be said about the commutator later. The integral structure of portions 25, 26 and 27 is the armature winding and a resinous material bonding the winding conductors together in a strong and rigid discoidal structure wherein the electrical conductors reinforce the resinous mass mechanically. The winding itself consists essentially of a plurality of multiple strand and/or turn coils laid in a flat circular array with the corresponding sides thereof overlapping the other corresponding sides, and with the outer and inner end-heads respectively nested together. The coils are identical, or as nearly identical as it is possible to make them and their shape is such that they minimize copper and yet fit well together in a compact winding. Once the coils are in place in the winding, their sides are pressed together to a specified coil side thickness and the entire winding is then encapsulated in a resinous material, e.g., an epoxy resin that will flow between the conductors. The resin may be reinforced with glass fibers in selected regions to improve the winding structure of electrical conductors bonded together by means of a resinous material. This structure is rigid and strong enough to be self supporting. The resin bonded winding structure is in the configuration of an annular disc portion 26 located between enlarged inner and outer ring portions 25 and 27 respectively, and the three portions are coaxial. Disc portion 26 is relatively thin and contains the sides of the coils, the sides being radial and at a span of approximately one pole pitch. The coil end-heads on the diverging ends of the sides are located in the outer ring portion 27 and the heads on the converging ends of the sides are located in the inner ring portion 25.

It is to be noted from FIGS. 2 and 3 that disc portion 26 is thicker at the inner ring portion 25 than it is at the outer ring portion 27. In these Figures the right hand side of the three portions 25, 26 and 27 is shown as a plane surface 29 normal to axis 21, and the disc portion 26 is shown tapering from the inner ring portion 25 to the outer ring portion 27, i.e., the disc portion is thicker at 25 than it is at 27. This is achieved by having the strands of the coil sides spread out in the plane of the disc as the sides progress radially outward from the inner ring portion. Hence the ratio of conductors to resin remains substantially uniform throughout the disc portion and also at a high level. Resin bonded winding structures of this type are illustrated and described in the aforementioned United States application Serial No. 534,009. A winding structure having a tapered disc portion is necessary for the type of commutator shown in FIGS. 2 to 4 and to be described later in more detail.

The hub 24 serves as a means for supporting the discoidal structure on its shaft for rotation on axis 21 and also as a fan for circulating a cooling medium clockwise around the discoidal structure, the hub having a number of axial fluid flow passages 30 and a number of radially disposed blades 31 for impelling the fluid outwardly. The hub may be bonded to the winding structure by means of the resin that bonds the coils together. The cooling medium circulated around the armature causes heat to be transferred from the armature to the ambient via the housing.

one pair of a number of pole pairs is shown in FIGS. 2 and 3. In this particular machine there are eight pairs of permanent magnet field poles. Each pair of poles consists of the deformations 32 and 33 in housing members 12 and 13 respectively and the permanent magnet structure 34. Each one of the deformations 32 has a flat inner surface 35 located axially opposite a similar flat surface 36 on a deformation 33, both surfaces being normal to axis 21. Magnet structure 34 may be a single permanent magnet or a plurality of unit permanent magnets; it has one flat surface bonded to surface 35, e.g., by soldering, brazing or cementing, and another parallel surface which defines a pole face 37. Surface 36 defines the other pole face of the pole pair. Pole faces 37 and 36 are parallel, normal to axis 21 and spaced far enough apart to leave room for the disc portion 26 of the armature and gaps between it and the pole faces for freedom of armature rotation. Magnet structures 34 alternate in polarity in the overall field structure so that magnetic flux is present in the gaps between the various pole faces 37, 36. Since housing members 12 and 13 are made of a magnetic material, they complete the flux paths.

It is to be noted from FIGS. 2 and 3 that the disc portion of the armature is somewhat thinner at the outer ring portion than it is at the inner ring portion. In certain armature structures it is thin enough in this region to accommodate a commutator and yet not make the gap between the pole faces too great for an adequate flux concentration in the gap. In these Figures, the gap is shown uniform in width, hence the flux in the gap should be relatively uniform. Neither a uniform gap, parallel pole faces, nor pole faces normal to the axis of rotation are necessary in the practice of this invention; however, what is necessary is an armature disc portion and gaps between pole faces that will accommodate the commutator now to be described.

Referring again to FIGS. 2 to 4, the commutator 23 consists of a plurality of conductive segments 38 located in an annular array on the tapered surface of the disc portion 26 adjacent the outer ring portion 27. The segments are flat and relatively thin conductors, e.g., copper segments, of trapezoidal plan form as shown in FIG. 4, and they are located edge-to-edge with insulating elements 39 between them so as to be insulated one from another. They are also insulated from the winding conductors except where connected to the winding turns, the connections made being one of a known winding circuit. The segments have one flat side bonded to the winding disc portion by means of a strong, adherent, insulating medium, e.g., an epoxy resin, and preferably, this bonding is done at the time that the winding conductors are encapsulated in the resinous bonding medium and in the same operation. The other flat sides of the segments present a working commutator face which may lie in a plane normal to axis 21 or deviate slightly therefrom as does the tapered side of the disc. A plane working face 40 normal to axis 21 is shown in FIGS. 2 and 3. The commutator is actually located in the gap between pole faces 37 and 36 with its face 40 spaced from pole face 37; it and the winding disc portion to which it is attached take up about the same gap space as the thickest portion of the disc portion.

Referring again to FIGS. 1 and 3, it will be seen that the brush assemblies 15 are located in the spaces between pole structures 32, 34. Each brush assembly 15 has a brush holder which is secured to housing member 12 and supports a brush 22 that makes good electrical contact with the working face of commutator 23 and is insulated from the housing and pole structures by the holder. The number of brush assemblies needed depends upon the circuits of the armature winding; there will be at least two brush assemblies, and usually a multiple of two. Two are indicated at 15 and 15a in FIG. 1. If more than two brush assemblies are required, they will be located in other spaces between adjacent pole structures as in the case of assembly 15.

A discoidal armature having a disc portion that is thinnest at the outer ring portion leaves room for a commutator such as 23 under the faces of the permanent magnet pole structures. When the pole structures are spaced far enough apart for brush assemblies between them, it is possible to provide a very compact machine in which all the vital components are totally enclosed. This machine is also very thin axially. There are applications where thinness is desirable in disc motors, especially in the smaller sizes, e.g. fractional HP ratings.

Although the single commutator machine will probably be preferred for most applications, the machine also lends itself to commutator duplexing, i.e., the provision of two separate commutators. Fig. 5 shows a disc armature provided with a duplex commutator.

In FIG. 5 there is shown a discoidal armature 50 mounted on a hub 51 and the hub on a shaft 52. The armature consists essentially of an integral structure of resin bonded conductors having an inner ring portion 53, a disc portion 54, an outer ring portion 55, a pre-stressed fiberglass band 56, and two commutators 57 and 58, all of which are coaxial with respect to shaft 52. The disc portion is thickest at the inner ring portion and tapers symmetrically therefrom to its juncture with the outer ring portion, where it is thinnest. Commutators 57 and 58 are bonded to the disc portion adjacent the outer ring portion. There is now a commutator under each face of the respective pole pairs and two sets of brush assemblies, one for each commutator located between the pole structures. One pole structure 59 is illustrated in FIG. 5; its face 60 overlaps commutator 57 but is spaced axially therefrom. The other faces of the pole pairs overlay commutator 58 in the same way. The segments of the two commutators are connected to the winding turns in a known way, and the two sets of brushes are interconnected in a known way.

FIG. 6 illustrates a discoidal armature 65 having generally the same shape as armature 50 of FIG. 5. Armature 65 comprises a plurality of standed coils 70 disposed overlapping in a flat, circular array and bonded together by means of a strong, adherent, non-conductive bonding medium, in the configuration of an annular disc portion 66 located between inner ring portion 67 and outer ring portion 68. The annular disc portion 66 contains coil sides 71 and 72, and the enlarged ring portions 67 and 68 on the inner and outer edges respectively, of the disc portion 66, contain the coil end conductors 73 and 74 of coils 70. The annular disc portion 66 has flat outer surfaces that converge from the inner ring portion 67 to the outer ring portion 68.

Each one of the coils 70 has sides 71 and 72 disposed radially at a span 75 of approximately one pole pitch; one pole pitch being the span between two adjacent poles of the machine 10. Coil sides 71 and 72, of each coil 70, contain strands which diverge in the plane of the disc portion 66 from the inner ring portion 67 to the outer ring portion 68 so as to provide an annular disc portion 66 having flat outer surfaces that converge from the inner ring portion 67 to the outer ring portion 68.

What I claim as new and desire to secure by Letters Patent of the United States is:

1. A discoidal armature for a dynamoelectric machine comprising a plurality of stranded coils disposed overlapping in a flat, circular array and bonded together by means of a strong, adherent, non-conductive bonding medium to provide a rigid discoidal structure having an annular disc portion containing the coil sides and integral with coaxial inner and outer ring portions containing the coil end-heads, each one of said coils having sides disposed radially at approximately one pole pitch and having the strands of the sides diverge in the plane of said disc portion from said inner ring portion to said outer ring portion so as to provide an annular disc portion having flat outer surfaces that converge from said inner ring portion to said outer ring portion; commutating means for said structure characterized by at least one annular array of commutator segments on said disc portion adjacent said outer ring portion and connected in circuit with said coils; and a strong, adherent, non-conductive bonding medium bonding said segments to said discoidal structure.

2. The armature defined in claim 1 wherein said commutating means is a single commutator.

3. The armature defined in claim 2 wherein said commutator segments are flat members having one flat side bonded to one of said flat outer surfaces of said disc portion and the other flat sides defining a commutator working face.

4. The armature defined by claim 1 wherein said commutating means is a duplex commutator.

5. The armature defined in claim 4 wherein one array of flat commutator segments has one flat surface therein secured to one of the outer surfaces of said disc portion, and a second like array of flat commutator segments has one flat surface thereon secured to the other outer surface of said disc portion, the other flat surface of the two arrays of segments define two working commutator faces.

6. The armature defined in claim 1, wherein the medium bonding said coils together also bonds the commutator segments to the winding structure.

* * * * *